United States Patent
Gangloff, Jr. et al.

(10) Patent No.: US 11,639,304 B2
(45) Date of Patent: May 2, 2023

(54) METHOD OF FABRICATING A GLASS-CERAMIC MATRIX COMPOSITE

(71) Applicant: United Technologies Corporation, Farmington, CT (US)

(72) Inventors: John J. Gangloff, Jr., Middletown, CT (US); Paul Sheedy, Bolton, CT (US); Rajiv Ranjan, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 580 days.

(21) Appl. No.: 16/784,384

(22) Filed: Feb. 7, 2020

(65) Prior Publication Data
US 2021/0246063 A1   Aug. 12, 2021

(51) Int. Cl.
C03B 9/347 (2006.01)
C03C 10/00 (2006.01)
C03C 14/00 (2006.01)

(52) U.S. Cl.
CPC .............. *C03B 9/347* (2013.01); *C03C 10/00* (2013.01); *C03C 14/002* (2013.01); *C03C 2214/20* (2013.01); *C03C 2214/34* (2013.01)

(58) Field of Classification Search
CPC ........... C03B 9/347; C03B 9/31; C03C 10/00; C03C 2214/20; C03C 2214/34; C03C 2214/02
See application file for complete search history.

(56) References Cited

U.S. PATENT DOCUMENTS

| | | | |
|---|---|---|---|
| 4,415,614 A * | 11/1983 | von Loewis of Menar | B32B 17/067 428/428 |
| 4,949,921 A * | 8/1990 | Jarmon | C03C 14/002 264/45.3 |
| 4,952,076 A | 8/1990 | Wiley, III et al. | |

(Continued)

FOREIGN PATENT DOCUMENTS

| | | | |
|---|---|---|---|
| DE | 3724995 | 9/1988 | |
| EP | 0501729 A1 * | 2/1992 | ............... C03B 9/31 |

(Continued)

OTHER PUBLICATIONS

European Search Report for European Application No. 20211652.1 completed May 11, 2021.

*Primary Examiner* — Noah S Wiese
(74) *Attorney, Agent, or Firm* — Carlson, Gaskey & Olds, P.C.

(57) ABSTRACT

A method of fabricating a glass matrix composite includes providing a fiber preform in a cavity of a die tooling, the fiber preform circumscribing an interior region; providing a parison of glass matrix material in the interior region, the glass matrix material having a first viscosity; introducing pressurized inert gas into the parison to outwardly inflate the parison against the fiber preform; and while under pressure from the pressurized inert gas, decreasing the first viscosity of the glass matrix material to a second viscosity. The pressure and the second viscosity cause the glass matrix material to flow and infiltrate into the fiber preform to thereby form a consolidated workpiece. The consolidated workpiece is then cooled to form a glass matrix composite.

18 Claims, 1 Drawing Sheet

(56) References Cited

U.S. PATENT DOCUMENTS

| | | | | |
|---|---|---|---|---|
| 5,049,329 A * | 9/1991 | Allaire | ............... | C03B 11/14 |
| | | | | 264/332 |
| 5,283,026 A | 2/1994 | Okumura et al. | | |
| 2004/0115041 A1 | 6/2004 | Scardicchio et al. | | |
| 2012/0201980 A1 * | 8/2012 | Stout | ............... | C04B 35/565 |
| | | | | 428/34.4 |
| 2015/0017351 A1 * | 1/2015 | Markel | ............ | C03B 9/3645 |
| | | | | 428/34.4 |
| 2015/0377552 A1 | 12/2015 | Jarmon | | |
| 2016/0229730 A1 | 8/2016 | Jarmon | | |

FOREIGN PATENT DOCUMENTS

| | | | | | |
|---|---|---|---|---|---|
| EP | 0712996 | A1 | 5/1996 | | |
| EP | 1630357 | A2 | 3/2006 | | |
| EP | 3444442 | A2 | 2/2019 | | |
| EP | 3708791 | A1 | 9/2020 | | |
| GB | 2209159 | A * | 5/1989 | ............ | C03B 11/14 |
| JP | H069277 | A * | 1/1994 | ............ | C04B 35/80 |
| WO | 2011105547 | | 6/2013 | | |
| WO | 2018183585 | | 10/2018 | | |

* cited by examiner

METHOD OF FABRICATING A GLASS-CERAMIC MATRIX COMPOSITE

STATEMENT REGARDING FEDERALLY SPONSORED RESEARCH OR DEVELOPMENT

This invention was made with Government support under DE-EE0008318 awarded by the United States. The Government has certain rights in this invention.

BACKGROUND

Glass-ceramic matrix composites ("GCMCs") generally have good thermomechanical properties and thus have potential for use in high temperature applications. This potential, however, has not been fully realized. For example, fabrication limitations of GCMCs can be a barrier to use. A particular fabrication technique must be capable of forming the desired end-use geometry of a component without substantially sacrificing the properties that make GCMCs desirable. In particular, relatively complex geometries, such as those that have complex curvatures, can hinder infiltration of glass matrix among reinforcing fibers. As a result, it may not be possible to form some components or, if the components can be formed, they have poor material properties due to incomplete infiltration or high porosity.

SUMMARY

A method of fabricating a glass matrix composite according to an example of the present disclosure includes providing a fiber preform in a cavity of a die tooling. The fiber preform circumscribes an interior region. A parison of glass matrix material is provided in the interior region and has a first viscosity. Pressurized inert gas is introduced into the parison to outwardly inflate the parison against the fiber preform. While under pressure from the pressurized inert gas, the first viscosity of the glass matrix material is decreased to a second viscosity. The pressure and the second viscosity cause the glass matrix material to flow and infiltrate into the fiber preform to thereby form a consolidated workpiece. The consolidated workpiece is then cooled to form a glass matrix composite.

In a further embodiment of any of the foregoing embodiments, the first viscosity is greater than from the second viscosity by a factor of at least 10.

A further embodiment of any of the foregoing embodiment includes holding the pressure for a period of time to saturate the fiber preform with the glass-containing matrix material.

In a further embodiment of any of the foregoing embodiments, the fiber preform is axisymmetric.

In a further embodiment of any of the foregoing embodiments, the fiber preform is formed of fibers selected from the group consisting of silicon carbide fibers, carbon fibers, $Si_3N_4$ fibers, SiBCN fibers, SiCN fibers, SiOC, SiAlOC fibers, SiZrOC fibers, SiTiOC fibers, $B_4C$ fibers, ZrC fibers, HfC fibers, alumino silicate fibers, $Al_2O_3$ fibers, $ZrO_2$ fibers, and combinations thereof.

In a further embodiment of any of the foregoing embodiments, the fiber preform has at least 2-axis curvature.

In a further embodiment of any of the foregoing embodiments, the fiber-reinforced matrix composite is, by volume percent, 20% to 80% of the glass-containing matrix material and 20% to 80% of the fiber preform.

A further embodiment of any of the foregoing embodiment includes pre-heating the parison outside of the interior region and then inserting the parison into the interior region.

In a further embodiment of any of the foregoing embodiments, the fiber preform initially has a first size, and the pressure causes the glass matrix material to compact the fiber preform to a second size against the mold tool.

A further embodiment of any of the foregoing embodiment includes, prior to providing the fiber preform in the cavity of the die tooling, depositing a glass layer on the cavity of the die tooling.

A method of fabricating a glass matrix composite according to an example of the present disclosure includes providing a fiber preform in a cavity of a die tooling. The fiber preform circumscribes an interior region and initially has a first size. A parison of glass matrix material is provided in the interior region, and pressurized inert gas is introduced into the parison to outwardly inflate the parison against the fiber preform. The pressure causes the glass matrix material to compress the fiber preform to a second size against the mold tool and also flow and infiltrate into the fiber preform to thereby form a consolidated workpiece. The consolidated workpiece is cooled to form a glass matrix composite.

A further embodiment of any of the foregoing embodiment includes holding the pressure for a period of time to saturate the fiber preform with the glass matrix material.

In a further embodiment of any of the foregoing embodiments, the fiber preform is axisymmetric.

In a further embodiment of any of the foregoing embodiments, the fiber preform is formed of fibers selected from the group consisting of silicon carbide fibers, carbon fibers, $Si_3N_4$ fibers, SiBCN fibers, SiCN fibers, SiOC, SiAlOC fibers, SiZrOC fibers, SiTiOC fibers, $B_4C$ fibers, ZrC fibers, HfC fibers, alumino silicate fibers, $Al_2O_3$ fibers, $ZrO_2$ fibers, and combinations thereof.

In a further embodiment of any of the foregoing embodiments, the fiber preform has at least 2-axis curvature.

In a further embodiment of any of the foregoing embodiments, the fiber-reinforced matrix composite is, by volume percent, 20% to 80% of the glass matrix material and 20% to 80% of the fiber preform.

A further embodiment of any of the foregoing embodiment includes pre-heating the parison outside of the interior region and then inserting the parison into the interior region.

A further embodiment of any of the foregoing embodiment includes, prior to providing the fiber preform in the cavity of the die tooling, depositing a glass layer on the cavity of the die tooling.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1A illustrates an example starting state of a method of fabricating a glass ceramic matrix composite, in which a fiber preform is provided in a mold tool.

FIG. 1B illustrates a next state of the method in which a glass parison is provided in the mold tool.

FIG. 1C illustrates a next state of the method in which the mold tool is closed and the glass parison is inflated with an inert gas.

FIG. 1D illustrates a next state of the method in which a viscosity of the glass parison is decreased to facilitate glass infiltration into the fiber preform.

DETAILED DESCRIPTION

Forming glass matrix or glass-ceramic matrix composites into complex geometries with good properties, and in a repeatable manner, can be challenging. As will be discussed herein, the disclosed methodology may be used to facilitate forming such composites into complex geometries with low porosity, although the methodology may also be applied to other geometries. For example, the method may be used to fabricate an annular combustor shell for a gas turbine engine, but it will be appreciated that the method may also be applied to other gas turbine engine components.

Figure 1E:
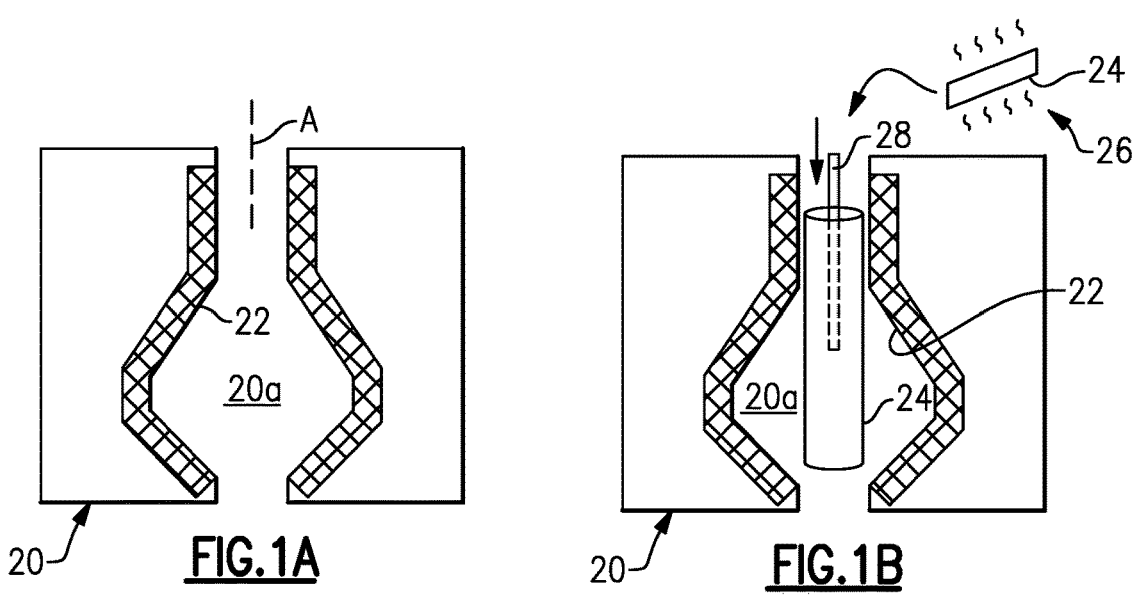
FIG. 1E illustrates a next state of the method in which the molded GCMC component is cooled for removal from the mold tool.
Figure 1E:
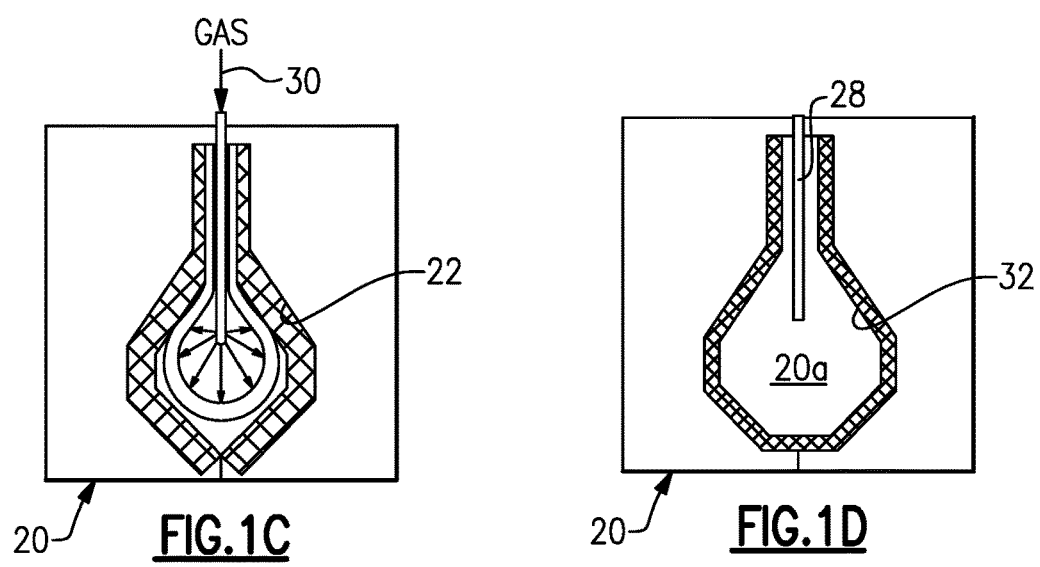
Figure 1E:
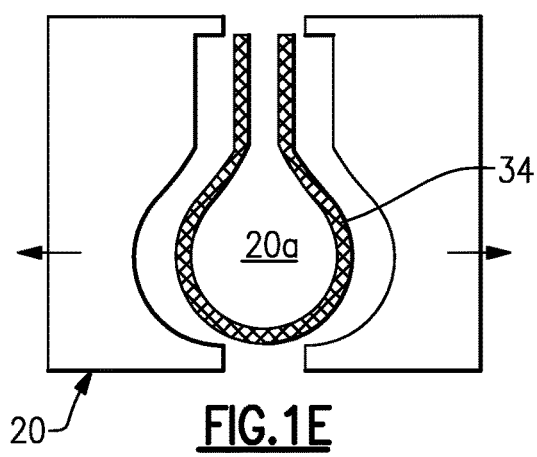

FIGS. 1A through 1E schematically depict several states through the disclosed methodology. Although these states may be presented individually herein and/or by steps, it is to be understood that some of these states may be performed or may occur in combination, over the same or overlapping time frame. The method is generally a glass blow-molding technique that is conducted in a die tooling 20, which is shown in FIG. 1A. The die tooling 20 in this example has two opposed die halves that form a cavity 20a there between. The cavity 20a is shaped in the geometry of the component being made. As is typical, the die halves are moveable relative to one another to open and close the cavity 20a. As an example, the die tooling 20 is formed of graphite, although not limited thereto. The die tooling 20 may be situated in a heater (not shown) with process gas (e.g., argon, nitrogen, carbon monoxide) capability or high vacuum capability (typically vacuum pressure less than 10' torr).

As also depicted in FIG. 1A, a fiber preform 22 is provided in the cavity 20a and generally lines the cavity 20a. The fiber preform 22 is thus located at the margins of the cavity 20a, and the portion of the cavity 20a inboard of the fiber preform 22 is referred to herein as an interior region. Although many different geometries may be used, the method in particular facilitates complex geometries. For instance, the fiber preform 22 (and also the cavity 20a) has at least 2-axis curvature (curvature about 2 axes).

The fiber preform 22 is a network of fibers, such as but not limited to, one or more layers of unidirectional fibers layers (e.g., fiber tape), woven sheets, or 3-dimensional fabrics. The layers, sheets, fabric, or other starting fiber material may be provided by laying-up the network of fibers in a desired configuration in the cavity 20a. In one further example, the fiber preform 22 is a braided tubular structure that generally conforms to the geometry of the cavity 20a. In a further example, the fiber preform 22 (and the cavity 20a) are axisymmetric about a central axis A. The types of fibers of the fiber preform 22 are not particularly limited. As an example, silicon carbide fibers, carbon fibers, $Si_3N_4$ fibers, SiBCN fibers, SiCN fibers, SiOC, SiAlOC fibers, SiZrOC fibers, SiTiOC fibers, $B_4C$ fibers, ZrC fibers, HfC fibers, alumino silicate fibers, $Al_2O_3$ fibers, $ZrO_2$ fibers, or combinations may be useful for combustors or other gas turbine engine components.

In some examples, the preform 22 may include other constituents or sub-components in addition to the fibers. For instance, the preform 22 may include pre-impregnated glass (e.g., a glass powder), pre-impregnated inorganic material, or polymeric binder. A pre-impregnated glass may facilitate densification or contribute to desired properties of the final product. Similarly, an inorganic material may facilitate densification or contribute to rigidization. A polymeric binder may facilitate the formation of the fibers into the geometry of the preform 22. The binder may be burned off prior to lay-up in the die tooling 20 or during processing. Sub-components may also be included, in the preform 22 and/or adjacent the preform 22 in the die tooling 20. Such sub-components may be, but are not limited to, pre-consolidated sub-components that are formed of glass-ceramic matrix composites or other materials, as long as the materials can substantially withstand the heat and pressure of the glass blow-molding process. For example, the preform 22 may be used in the glass blow-molding process to additively join several pre-consolidated sub-components.

As shown in FIG. 1B, while the cavity 20a is open, a parison 24 of glass matrix material is provided in the interior region in the cavity 20a. The parison 24 is a solid block, but may alternatively be a hollow structure. The glass matrix material is generally a glass that is composed mostly of silica but may contain other oxides, such as but not limited to, oxides of calcium, magnesium, barium, boron, aluminum, sodium, potassium, or combinations thereof. Most typically, the parison 24 will be made only of the glass and will exclude fillers that hinder or prevent inflation. Additional example glass may include, but is not limited to, borosilicate glass $B_2O_3$ x—$Al_2O_3$ y—$nSiO_2$, $Li_2O$ x—$Al_2O_3$ y—$nSiO_2$—System (LAS-System), MgO x—$Al_2O_3$ y—$nSiO_2$—System (MAS-System), ZnO x—$Al_2O_3$y—$nSiO_2$—System (ZAS-System), CaO x—$Al_2O_3$y—$nSiO_2$—System (CAS), BaO x—MgO y—$Al_2O_3$ z—$nSiO_2$—System (BMAS-System), BaO x—$Al_2O_3$ y—$nSiO_2$—System (BAS-System), SrO x—$Al_2O_3$y—$nSiO_2$—System (SAS-System), REO—x—$Al_2O_3$—$nSiO_2$— Systems (where REO are oxides of the rare earth metals, La, Ce, Pr, Nd, Pm, Sm, Eu, Gd, Tb, Dy, Ho, Er, Tm, Yb, Lu, including Sc, Y, and Hf), and the like, including combinations. The glass matrix material may be selected in accordance with the type of fibers used in the preform 22, viscosity at the desired processing temperatures, and end-use requirements.

The parison 24 is at first temperature which corresponds to a first viscosity at which the parison 24 can be inflated. As will be appreciated, the first temperature and the first viscosity will depend on the composition of the glass used. Such temperature and viscosity will be recognized by those skilled in the art given the benefit of this disclosure, but is generally above 500° C. and below 1500° C. Viscosity can be obtained from known reference charts showing viscosity versus temperature.

The first temperature and first viscosity can be achieved by pre-heating the parison 24 outside of the die tooling 20, as depicted at 26. For example, the parison 24 is pre-heated in a separate heating chamber and then inserted into the die tooling 20. Alternatively, the parison 24 is heated while in the die tooling 20 using the heating chamber in which the mold tool 20 is located. That is, the die tooling 20 and the parison 24 are heated at the same temperature. In a further alternative, the parison 24 is partially pre-heated in a separate heating chamber to a temperature lower than the desired first temperature and then heated the remaining amount in the die tooling 20. As shown, the parison 24 also includes a gas tube 28 for inflation.

As depicted in FIG. 1C, the die tooling 20 is then closed and an inert pressurized gas 30 is introduced into the parison 24 via the gas tube 28 to inflate the parison 24 outwardly against the fiber preform 22. The force of the parison 24 against the preform 22 may also serve to compress (debulk) the fiber preform 22. An inert gas is one that does not substantially react with the glass or fiber preform 22 under the fabrication conditions. For example, the inert gas is argon, nitrogen, helium, carbon monoxide, or mixtures thereof. The flow rate and pressure of the inert gas is controlled to inflate the parison 24. For instance, the flow rate and pressure are controlled to avoid puncturing the parison 24 during inflation and, optionally, to adjust the compressive force against the fiber preform 22.

Referring to FIG. 1D, the glass infiltrates into the fiber preform 22 to form a green workpiece 32. While under pressure from the inert pressurized gas, the glass begins to infiltrate into the fiber preform 22 and continues to compress the fiber preform 22. This infiltration is enhanced, however, by heating the parison 24 to increase the first temperature to a second temperature, thereby decreasing the first viscosity of the glass to a second viscosity, i.e., an in-process, in-situ viscosity adjustment. At this second, lower viscosity the glass can more readily flow and infiltrate between the fibers of the fiber preform 22 under the continued pressure from the inert gas. Notably, this second, lower viscosity also permits the glass to more readily flow into and fill complex geometries of the fiber preform 22, such as into corner regions and regions of 2-axis curvature. As a result, in comparison to the first viscosity, fewer voids are expected by adjusting to the second viscosity. If the preform 22 includes pre-impregnated glass, the pre-impregnated glass may also soften and flow among the fibers. If the preform 22 includes inorganic fillers, the glass may also flow around the fillers.

In general, the first viscosity is greater than the second viscosity by a factor of 10 or more, or in further examples, by a factor of 100 or more but not typically more than a factor of 10000. In one example, the first viscosity is above $10^4$ Poise, and the second viscosity is below $10^2$ Poise. The second viscosity will practically be limited to a viscosity at which the glass becomes too thin for the pressure of the inert gas to act on over the time frame of the process.

The pressure of the inert gas may also be controlled to drive the glass into the preform 22. Moreover, the pressure may be held for a period of time to saturate the fiber preform 22 with the glass. The hold does not necessarily imply that the pressure is constant, only that pressure is maintained above minimum levels. Therefore, as long as the pressure is above the minimum, the pressure may be increased, decreased, cycled, etc. Flow rate may also be monitored or controlled in order to maintain or effectuate a desired increase, decrease, or cycling or pressure. Those skilled in the art with the benefit of this disclosure will recognize useful flow rates and pressures. In examples, the pressure is from 0.6 MPa (100 psi) to 138 MPa (20 ksi). As will also be appreciated, the optimal pressures may differ between different compositions of the glass and/or between components of different sizes. For relatively large sizes, multiple gas tubes 28 may be used to provide multiple gas injection locations to facilitate more uniform inflation.

The workpiece is then cooled to form a glass matrix composite 34 as shown in FIG. 1E. For example, the cooling is conducted under an inert gas flow, such as by maintaining a flow of the inert gas from the prior steps. For instance, the glass matrix composite 34 is cooled to a point at which it is self-supporting and can be removed from the die tooling 20 without substantial damage. This cooling scheme is not limited, and it is to be appreciated that alternative cooling schemes could be used.

In further examples, the glass matrix composite 34 is, by volume percent, 20% to 80% of the glass matrix material and a remainder of 20% to 80% of the fiber preform 22. Thus, the level of compression of the preform 22 is selected in conjunction with the volume of the glass of the parison 24 to achieve the desired glass-to-fiber volume ratio.

Subsequently, the glass matrix composite 34 may be subjected to one or more further processing steps. One example processing step includes a heat treatment step that causes crystallization of at least of portion of the glass matrix to convert it to a glass-ceramic matrix. Such a heat treatment may be conducted in the die tooling 20 as a further step in the blow-molding process or in a later, separate step before or after other post-consolidation steps.

In one further example of the process described above, two parisons 24 are used. A first parison 24 is used prior to introduction of the preform 22 into the die tooling 20 and is expanded outwards in the manner discussed above but is expanded to conform against the sides of the die tooling 20 (the steps as in FIGS. 1B and 1C but without the preform 22). This first parison 24 is thus used to deposit a layer of glass on the sides of the die tooling 20. Subsequently, the preform 22 is introduced into the die tooling 20 and onto the layer of glass and the process then continues as from FIG. 1B described above to expand what will be a second parison 24. This enables glass matrix material to infiltrate into the preform 22 from both sides to facilitate fewer voids.

In further examples, the glass of the first and second parisons 24 may be of different glass compositions in order to infiltrate the respective sides of the preform 22 with glasses having differing properties. In this manner, the sides of the preform 22, and thus ultimately the final composite 34, can be tailored for different properties. As will be appreciated, the glass compositions may require the use of different processing temperatures. In this regard, one temperature or temperature range may be used for expanding the first parison 24, followed by use of a second different temperature or temperature range for the second parison 24. Most typically, the second temperature or temperature range will be lower than the first so as to avoid substantially affecting the glass from the first parison 24.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of fabricating a glass matrix composite, the method comprising:

providing a fiber preform in a cavity of a die tooling, the fiber preform having at least 2-axis curvature and circumscribing an interior region;

providing a parison of glass matrix material in the interior region, the glass matrix material having a first viscosity;

introducing pressurized inert gas into the parison, the pressurized inert gas causing the parison to outwardly inflate against the fiber preform;

while outwardly inflated against the fiber preform and under pressure from the pressurized inert gas, decreasing the first viscosity of the glass matrix material to a second viscosity, the pressure and the second viscosity causing the glass matrix material to flow and infiltrate into the fiber preform to thereby form a consolidated workpiece; and cooling the consolidated workpiece to thereby form a glass matrix composite.

2. The method as recited in claim 1, wherein the first viscosity is greater than from the second viscosity by a factor of at least 10.

3. The method as recited in claim 1, further comprising holding the pressure for a period of time to saturate the fiber preform with the glass-containing matrix material.

4. The method as recited in claim 1, wherein the fiber preform is axisymmetric.

5. The method as recited in claim 1, wherein the fiber preform is formed of fibers selected from the group consisting of silicon carbide fibers, carbon fibers, $Si_3N_4$ fibers, SiBCN fibers, SiCN fibers, SiOC, SiAlOC fibers, SiZrOC fibers, SiTiOC fibers, $B_4C$ fibers, ZrC fibers, HfC fibers, alumino silicate fibers, $Al_2O_3$ fibers, $ZrO_2$ fibers, and combinations thereof.

6. The method as recited in claim 1, wherein the fiber-reinforced matrix composite is, by volume percent, 20% to 80% of the glass-containing matrix material and 20% to 80% of the fiber preform.

7. The method as recited in claim 1, further comprising pre-heating the parison outside of the interior region and then inserting the parison into the interior region.

8. The method as recited in claim 1, wherein the fiber preform initially has a first size, and the pressure causes the glass matrix material to compact the fiber preform to a second size against the mold tool.

9. The method as recited in claim 1, further comprising, prior to providing the fiber preform in the cavity of the die tooling, depositing a glass layer on the cavity of the die tooling.

10. A method of fabricating a glass matrix composite, the method comprising:
providing a fiber preform in a cavity of a die tooling, the fiber preform circumscribing an interior region and initially having a first size, and the fiber preform being formed of fibers selected from the group consisting of silicon carbide fibers, carbon fibers, $Si_3N_4$ fibers, SiBCN fibers, SiCN fibers, SiOC, SiAlOC fibers, SiZrOC fibers, SiTiOC fibers, $B_4C$ fibers, ZrC fibers, HfC fibers, alumino silicate fibers, $Al_2O_3$ fibers, $ZrO_2$ fibers, and combinations thereof;
providing a parison of glass matrix material in the interior region;
introducing pressurized inert gas into the parison to outwardly inflate the parison against the fiber preform, the pressure causing the glass matrix material to compress the fiber preform to a second size against the mold tool and also flow and infiltrate into the fiber preform to thereby form a consolidated workpiece; and
cooling the consolidated workpiece to thereby form a glass matrix composite.

11. The method as recited in claim 10, further comprising holding the pressure for a period of time to saturate the fiber preform with the glass matrix material.

12. The method as recited in claim 10, wherein the fiber preform is axisymmetric.

13. The method as recited in claim 10, wherein the fiber preform has at least 2-axis curvature.

14. The method as recited in claim 10, wherein the fiber-reinforced matrix composite is, by volume percent, 20% to 80% of the glass matrix material and 20% to 80% of the fiber preform.

15. The method as recited in claim 10, further comprising pre-heating the parison outside of the interior region and then inserting the parison into the interior region.

16. The method as recited in claim 10, further comprising, prior to providing the fiber preform in the cavity of the die tooling, depositing a glass layer on the cavity of the die tooling.

17. A method of fabricating a glass matrix composite, the method comprising:
providing a fiber preform in a cavity of a die tooling, the fiber preform circumscribing an interior region;
providing a parison of glass matrix material in the interior region, the glass matrix material having a first viscosity;
introducing pressurized inert gas into the parison, the pressurized inert gas causing the parison to outwardly inflate against the fiber preform;
while outwardly inflated against the fiber preform and under pressure from the pressurized inert gas, decreasing the first viscosity of the glass matrix material to a second viscosity, the first viscosity being greater than the second viscosity by a factor of at least 10, the pressure and the second viscosity causing the glass matrix material to flow and infiltrate into the fiber preform to thereby form a consolidated workpiece; and
cooling the consolidated workpiece to thereby form a glass matrix composite.

18. The method as recited in claim 17, wherein the fiber preform is formed of fibers selected from the group consisting of silicon carbide fibers, carbon fibers, $Si_3N_4$ fibers, SiBCN fibers, SiCN fibers, SiOC, SiAlOC fibers, SiZrOC fibers, SiTiOC fibers, $B_4C$ fibers, ZrC fibers, HfC fibers, alumino silicate fibers, $Al_2O_3$ fibers, $ZrO_2$ fibers, and combinations thereof, the fiber preform has at least 2-axis curvature, and the fiber-reinforced matrix composite is, by volume percent, 20% to 80% of the glass matrix material and 20% to 80% of the fiber preform.

\* \* \* \* \*